United States Patent [19]

Gorbett

[11] Patent Number: 4,619,329
[45] Date of Patent: Oct. 28, 1986

[54] SOIL AERATOR

[76] Inventor: Cleon Gorbett, 6224 Indian Creek Dr., Ft. Worth, Tex. 76107

[21] Appl. No.: 710,998

[22] Filed: Mar. 12, 1985

[51] Int. Cl.[4] .............................................. A01B 45/02
[52] U.S. Cl. ..................................... 172/21; 172/554; 172/240
[58] Field of Search ................... 172/68, 122, 554, 21, 172/540, 548, 123

[56] References Cited

U.S. PATENT DOCUMENTS

| 223,927 | 1/1880 | Lafeber | 172/554 |
|---|---|---|---|
| 1,370,219 | 3/1921 | Miller | 172/21 |
| 1,898,214 | 2/1933 | Richards | 172/21 |
| 2,159,347 | 5/1939 | Austin | 172/554 |
| 2,314,035 | 3/1943 | Dontje | 172/21 |
| 2,476,084 | 7/1949 | Cour | 172/21 |
| 2,618,518 | 11/1952 | Haltom | 172/548 |
| 2,726,590 | 12/1955 | Campbell | 172/21 |
| 2,778,291 | 1/1957 | Kerns | 172/21 X |
| 2,857,835 | 10/1958 | Fitzgerald | 172/554 |
| 3,160,123 | 12/1964 | Roquemore | 111/1 |
| 3,393,751 | 7/1968 | Mascaro | 172/22 |
| 3,718,192 | 2/1973 | Rogers | 172/21 |
| 3,794,121 | 2/1974 | Drozak | 172/21 |
| 3,963,078 | 6/1976 | Lely | 172/123 |
| 4,152,993 | 5/1979 | Lely | 172/68 X |

FOREIGN PATENT DOCUMENTS 986352  3/1965  United Kingdom ................ 172/540

Primary Examiner—Richard J. Johnson
Attorney, Agent, or Firm—Charles D. Gunter, Jr.

[57] ABSTRACT

A soil aerator is shown which includes a frame and a rotatable drum mounted on the frame. The drum has an outer cylindrical surface. The opposing ends of the drum are enclosed and carry axles which are mounted within the frame whereby the drum is rotatable with respect to the frame about the longitudinal axis of the drum. A plurality of triangular-shaped teeth are arranged in rows on the outer cylindrical surface of the drum. Each of the rows of teeth forms a chevron-shaped pattern with respect to the next succeeding row of teeth.

2 Claims, 5 Drawing Figures

SOIL AERATOR

BACKGROUND OF THE INVENTION

1. Field of the Invention

The present invention relates to soil aerators of the type utilized to penetrate the surface of the earth to provide increased ventilation and facilitate moisture retention.

2. Description of the Prior Art

U.S. Pat. No. 3,794,121, to Drozak, issued Feb. 26, 1974, shows a soil aerator having a cylindrical drum mounted on a framework which is carried by a tractor. A plurality of tubular soil penetrating spikes are mounted on the exterior surface of the cylindrical drum.

U.S. Pat. No. 1,898,214, to Richards, issued Feb. 21, 1933, shows a lawn aerator which includes a drum having a number of small, sharp spikes made of spring steel. The drum may be filled with water or sand to give it sufficient weight.

U.S. Pat. No. 1,370,219, to Miller, issued Mar. 1, 1921, shows a cultivator for aerating top soil, having a plurality of disk or plate members with penetrating prongs that are designed to pierce the earth as the device is moved over the earth's surface.

The spikes or prongs used on aerators in the past have tended to be easily damaged because of the large compressive and bending forces encountered by each of the individual spikes during use, and when engaging hard objects in or on the surface of the ground. The large forces encountered tended to cause the spikes or prongs to wear rapidly and to frequently break or crack. Perhaps more importantly, aerators of the type discussed above had spike arrangements which caused substantial damage to the surface of the soil which is usually planted with grass or other ground cover vegetation.

There exists a need, therefore, for an aerator useful for ventilating soil which has penetrating members which are not easily broken or damaged.

There exists a need for such an aerator having an arrangement of penetrating members which increases the surface area of the soil for contact with oxygen, but which does not damage the root system or vegetation of the planted ground cover.

SUMMARY OF THE INVENTION

The soil aerator of the invention includes a frame and a rotatable member mounted on the frame. The rotatable member has an outer cylindrical surface formed along a longitudinal axis of the member and opposing ends of the member are enclosed to form a drum. The drum is rotatable with respect to the frame about the longitudinal axis of the drum. A plurality of protrusions are arranged in rows on the outer cylindrical surface of the drum. Each of the rows of protrusions forms a chevron-shaped pattern with respect to a next succeeding row of protrusions.

Preferably the protrusions are triangular-shaped teeth. Each of the teeth has a pair of opposing sidewalls which taper from a base to an apex, and the protrusions are oriented on the drum with the apexes extending radially outwardly from the cylindrical surface. The opposing sidewalls of each of the triangular-shaped teeth are separated by a uniform thickness, and each of the opposing sidewalls has a width at the base thereof which is greater than the thickness. The protrusions in any given row on the outer cylindrical surface are offset along the longitudinal axis of the drum with respect to the protrusions in the next succeeding row, so that the rows of teeth are formed in staggered relationship.

DETAILED DESCRIPTION OF THE INVENTION

Figure 1:
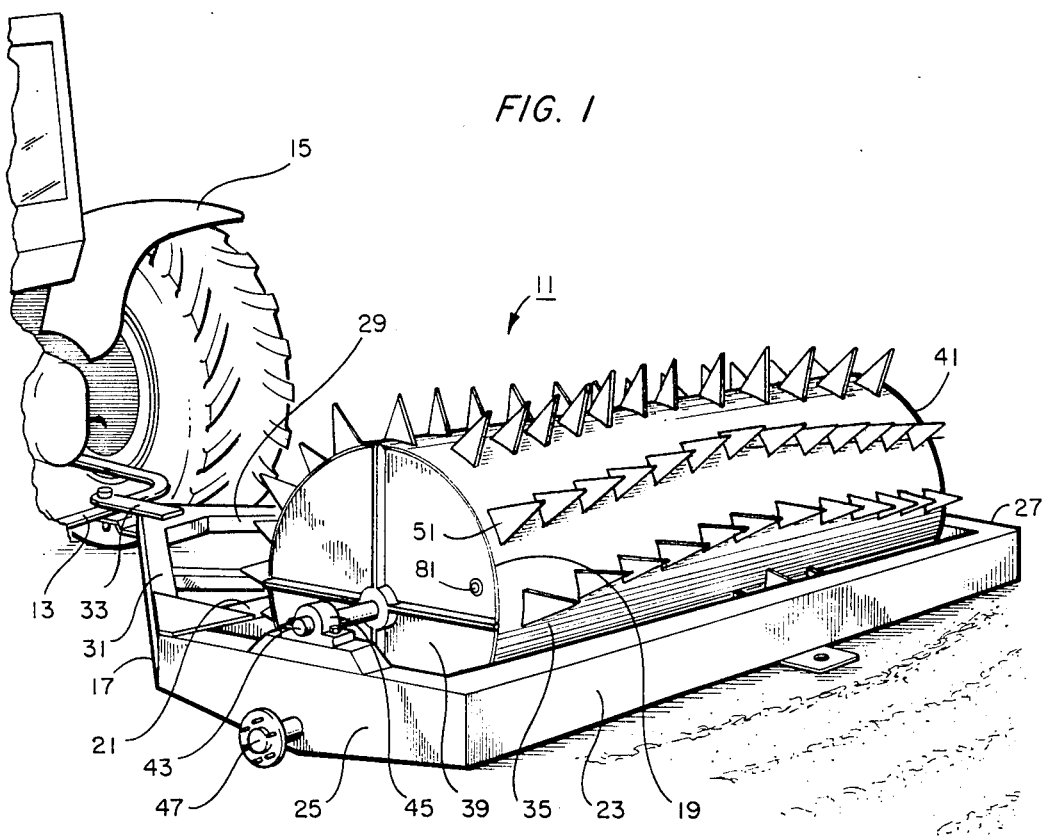
FIG. 1 is a perspective view of a soil aerator of the invention which is being pulled by a tractor over the earth's surface.

FIG. 1 shows a soil aerator of the invention designated generally 11. The aerator 11 is attached by means of a hitch 13 to a tractor 15. The aerator 11 comprises a frame 17 onto which a rotatable member 19 is mounted. The frame 17 includes front and rear rectangular frame bars 21, 23, and opposing side frame bars 25, 27, respectively. A pair of end bars 29, 31 converge inwardly from the front frame bar 21, in triangular fashion. The end bars 29, 31 converge to form a suitable connecting member 33 which connects to the tractor hitch 13.

The rotatable member 19 has an outer cylindrical surface 35 which is formed along a longitudinal axis 37 of the member 19. The member 19 is of constant diameter along its length and is closed at its ends by disks 39, 41, to form a hollow drum. A pair of identical axles (43 shown in FIG. 1) extend at right angles to the disks 39, 41, and are received within bearings (45 in FIG. 1) which rotatably support the drum upon the side frame bars 25, 27. The drum 19 is thus rotatable about the longitudinal center line 37 shown in FIG. 3.

Figure 2:
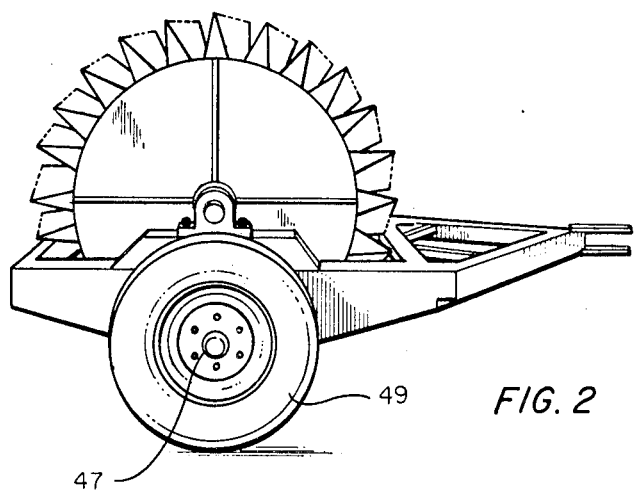
FIG. 2 is a side, perspective view of the soil aerator of the invention with wheels mounted thereon for transporting the aerator over a road or highway.

The diameter of the drum 19 is such that the outer cylindrical surface 35 contacts the surface of the earth as the frame 17 is pulled by the tractor 15. The side frame bars 25, 27 also include wheel axles (47 shown in FIG. 1) which are located generally below, and in a parallel plane to the drum axles 43. As shown in FIG. 2, tires 49 can be mounted on the wheel axles 47, as by jacking up the frame 17 so that the rotatable drum 19 no longer contacts the earth's surface. In this way, the aerator 11 can be transported on the highway or over other surfaces where aeration is not desired.

Figure 3:
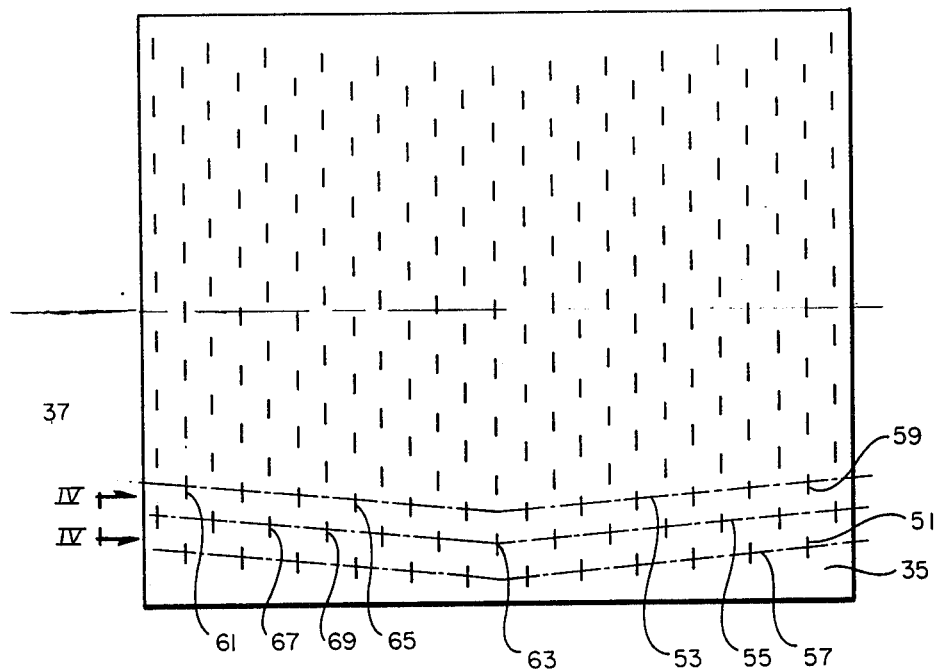
FIG. 3 is a simplified, schematic view of the teeth placement on the drum of the aerator of FIG. 1.

As shown in FIG. 1, the outer cylindrical surface of the drum 19 includes a plurality of protrusions 51 which are arranged in rows on the surface of the drum. FIG. 3 is a partial, plan view of the teeth arrangement, viewed as if the cylindrical drum 19 were laid out flat. In the embodiment shown in FIG. 1, the cylindrical drum 19 is actually provided with 14 rows of protrusions. Three of the rows of protrusions are shown in the plan view and designated as 53, 55, and 57. Thus, each row of protrusions is formed as a relaxed V-shape which converges from an outer extent 59, 61, thereof, to an apex 63. The protrusions in any given row, such as row 53, are offset along the longitudinal axis 37 of the drum 19 with respect to the protrusions in the next succeeding row 55 so that the rows of teeth are formed in staggered relationship. Thus, tooth 65 in row 53 is located approximately midway between teeth 67 and 69 in row 55. Although only three rows of teeth are shown for simplicity in FIG. 3, for a 40" diameter drum, there are actually 14 rows of teeth. The rows of teeth alternate in the preferred embodiment with seven rows of 12 teeth each, alternating with seven rows of 13 teeth each.

Figure 4:
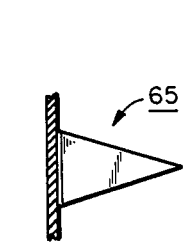
FIG. 4 is an isolated, side view of one of the teeth of the aerator.
Figure 5:
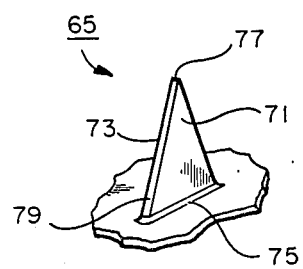
FIG. 5 is an isolated view of one of the aerator teeth, similar to FIG. 4, showing the top view of the tooth.

As shown in FIGS. 4 and 5, each of the teeth 65 is a triangular-shaped member having a pair of opposing sidewalls 71, 73 which taper from a base 75 to an apex 77. The teeth are welded to the cylindrical surface of the drum 19 and are oriented on the drum with the apexes 77 extending radially outwardly from the cylindrical surface 35. The opposing sidewalls 71, 73 and each of the triangular-shaped teeth 65 are separated by a uniform thickness 79, and each of the opposing sidewalls 71, 73 has a width at the base 75 thereof which is greater than the thickness 79. As shown in FIG. 4, each tooth is formed generally as an equilateral triangle, and the teeth are arranged on the drum 19 with the sidewalls 71, 73 in a plane parallel to the plane of the disks (39, 41 in FIG. 1).

The drum 19 is also provided with one or more fill ports 81, so that the drum can be filled with water, sand, or the like, to increase the weight of the drum.

An invention has been provided with several advantages. The tooth arrangement shown allows the aerator to put the greatest force on the least teeth to achieve the greatest punching power. Because of the unique tooth shape, the present aerator attempts to apply the greatest force over the least tooth area to achieve the greatest stress or pushing power. Previous spike or prong tooth arrangements could not withstand the stress and would break or become damaged. The tooth arrangement and tooth shape of the present aerator also provide the maximum ventilation effect with a minimum of damage or disruption to the ground cover or vegetation present. As the teeth rotate and make contact, their unique shape and arrangement allows them to achieve maximum penetration in the form of a slot in the ground. As the drum continues to roll, the teeth are retracted from the slot which has been created without disturbing the surrounding vegetation. The unique slicing, punching motion is especially suited for aerating pastures where grass or other ground vegetation is being grown.

Using the preferred embodiment of the aerator described, over 72,000 slotted holes are punched during one pass over an acre of pasture. The surface area of the inside of the holes adds 25 to 30 percent to the ventilatable area, allowing more oxygen to reach the plant roots and also improving moisture retention.

While the invention has been shown in only one of its forms, it is not thus limited, but is susceptible to various changes and modifications thereto without departing from the spirit thereof.

I claim:
1. A soil aerator of the type which increases the surface area of the soil for contact with oxygen without damaging vegetation planted in the soil, comprising:
   a towing frame;
   a rotatable member mounted on said frame, said rotatable member having an outer cylindrical supporting surface formed along a longitudinal axis of said member, the opposing ends of said member being enclosed by disks to form a drum, said drum being rotatable with respect to said frame about the longitudinal axis of said drum;
   a plurality of circumferentially and axially spaced protrusions arranged in rows on said outer cylindrical surface of said drum, each of said rows of protrusions forming a chevron-shaped pattern with respect to a next succeeding row of protrusions, the protrusions in any given row on said outer cylindrical surface being offset along the longitudinal axis of said drum with respect to the protrusions in the next succeeding row, so that the rows of teeth are formed in staggered relationship;
   said protrusions being triangular-shaped teeth, each of said teeth having a pair of opposing, planar sidewalls which are separated by a uniform thickness, each opposing sidewall having a base located on the outer cylindrical surface and a pair of sides which converge in an outward radial direction to form an apex, the intersection of each side with said base forming a base angle, each of said base angles being approximately equal; and
   said teeth being arranged on said drum with said sidewalls in a plane generally perpendicular to the longitudinal axis of said drum.
2. A soil aerator of the type which increases the surface area of the soil for contact with oxygen without damaging vegetation planted in the soil, comprising:
   a towing frame having opposing sides;
   a rotatable member mounted on said frame between selected ones of said opposing sides, said rotatable member having an outer cylindrical supporting surface formed along a longitudinal axis of said member, the opposing ends of said member being enclosed by disks to form a drum;
   at least one fill port in said drum for filling said drum to increase the weight of said drum;
   an axle extending at a right angle from each of said disks for rotatably mounting said drum within said frame;
   a pair of auxiliary axles extending from opposing sides of said frame, each of said auxiliary axles being adapted to receive a wheel for transporting said aerator;
   a plurality of circumferentially and axially spaced protrusions arranged in rows on said outer cylindrical surface of said drum, each of said rows of protrusions forming a chevron-shaped pattern with respect to a next succeeding row of protrusions, the protrusions in any given row on said outer cylindrical surface being offset along the longitudinal axis of said drum with respect to the protrusions in the next succeeding row, so that the rows of teeth are formed in staggered relationship;
   said protrusions being triangular-shaped teeth, each of said teeth having a pair of opposing, planar sidewalls which are separated by a uniform thickness, each opposing sidewall having a base located on the outer cylindrical surface and a pair of sides which converge in an outward radial direction to form an apex, the intersection of each side with said base forming a base angle, each of said base angles being approximately equal; and
   said teeth being arranged on said drum with said sidewalls in a plane generally perpendicular to the longitudinal axis of said drum.

* * * * *